US006978201B1

(12) United States Patent
Chen et al.

(10) Patent No.: US 6,978,201 B1
(45) Date of Patent: Dec. 20, 2005

(54) MODEL BASED KICKDOWN SHIFT METHOD FOR CLUTCH TO CLUTCH SHIFT TRANSMISSIONS WITH ACCUMULATORS

(75) Inventors: Gang Chen, Rochester Hills, MI (US); David L Kwapis, Auburn Hills, MI (US); Aaron Pfadt, Salt Lake City, UT (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/020,820

(22) Filed: Dec. 22, 2004

(51) Int. Cl.[7] .............................................. G06F 17/00

(52) U.S. Cl. ......................... 701/51; 701/58; 192/3.25; 74/731.1; 475/125

(58) Field of Search .............................. 701/51, 52, 55, 701/58, 59, 60, 61; 192/3.25, 3.28, 3.29, 192/3.3, 87.1, 3.51, 3.57, 87.13, 87.18, 85 R; 74/731.1–733; 475/116–129

(56) References Cited

U.S. PATENT DOCUMENTS

| | | | | |
|---|---|---|---|---|
| 4,996,894 | A * | 3/1991 | Holbrook et al. | 477/62 |
| 5,115,694 | A * | 5/1992 | Sasaki et al. | 477/98 |
| 5,385,511 | A * | 1/1995 | Iizuka | 475/132 |
| 5,612,874 | A * | 3/1997 | Schulz et al. | 701/51 |
| 5,646,842 | A * | 7/1997 | Schulz et al. | 701/51 |
| 5,722,519 | A * | 3/1998 | Kirchhoffer et al. | 192/3.3 |
| 5,758,302 | A * | 5/1998 | Schulz et al. | 701/51 |
| 5,842,949 | A * | 12/1998 | Kuriyama | 477/63 |
| 6,093,133 | A * | 7/2000 | Danielsen et al. | 477/117 |
| 6,332,855 | B1 * | 12/2001 | Murasugi | 475/116 |

* cited by examiner

*Primary Examiner*—Richard M. Camby
(74) *Attorney, Agent, or Firm*—Ralph E. Smith

(57) ABSTRACT

A transmission control method improves shift feel during kickdown shifts. The release clutch is fully released at the initiation of the kickdown shift. The release clutch is then reapplied when the volume of the release clutch reaches a threshold capacity. The volume of the release clutch is slowly ramped down, thereby increasing turbine speed. When the turbine speed reaches a threshold, the apply clutch is actuated. The apply clutch is actuated by controlling the volume of the apply clutch according to a target volume.

11 Claims, 2 Drawing Sheets

MODEL BASED KICKDOWN SHIFT METHOD FOR CLUTCH TO CLUTCH SHIFT TRANSMISSIONS WITH ACCUMULATORS

FIELD OF THE INVENTION

The present invention relates to automotive transmissions, and more particularly to controlling kickdown shifts in automotive transmissions based on accumulator feedback.

BACKGROUND OF THE INVENTION

Due to relatively high instances of system inertia and delay in automotive transmissions, feedback control of various components in automotive transmissions is not appropriate for certain transient elements. Control of transmission turbine speed during a kickdown shift is one example of a transient condition in automotive transmissions. During a kickdown shift, such as a drop from $4^{th}$ gear to $3^{rd}$ gear, or from $3^{rd}$ gear to $2^{nd}$ gear, the speed of the turbine must increase to correspond to a targeted gear ratio. Additionally, the acceleration of the turbine must be controlled to correspond to a targeted acceleration according to current vehicle acceleration. In such transient cases, feedforward control can be used to anticipate system changes. For example, mixed feedforward and feedback control can be used for a smooth kickdown shift without causing significant "feel" issues for the driver, thereby improving overall shift quality. Shift quality has been shown to be an important factor for driver satisfaction.

Automotive transmissions may use accumulators to absorb apply pressure fluid during certain shift operations. The presence of the accumulator reduces sensitivity of torque variations in torque phase during shifts. However, accumulators cause the pressure response to be slower and more difficult to predict since the solenoid current directly controls the flow rate and indirectly controls the pressure. With reference to FIG. 1, a typical accumulator 10 includes one or more springs 12 and a piston 14. Fluid fills the accumulator 10 and compresses the spring 12. The volume of the accumulator 10 varies over the usable range of the spring 12, and is indicative of the volume of a particular shift element in the transmission. The volume of the shift element is a further indicator of the capacity of the shift element, which may be used for control purposes. Target volume kickdown logic determines a target volume for the shift element, and subsequently calculates a change in shift element volume required for proper control. Control based on target volume can be used to calculate changes in element capacity or volume that are required to achieve target acceleration. As a result, excessive runaway or harshness during shifting is prevented.

Target volume control can be determined according to desired volume change due to turbine inertia force and/or desired volume change due to engine inertia force. Conventionally, empirical methods are used to determine target volume control. For example, change in volume can be calculated according to relationships between turbine inertia force, engine inertia force, accumulator pressure, and/or release element clutch pressure. However, such empirical methods are not particularly accurate in practice because turbine acceleration and engine acceleration each belong to independent dynamic systems. Therefore, the release element clutch cannot directly control engine acceleration. When the release element clutch is used to control turbine acceleration, turbine torque from the engine must be assumed as a fixed input through the torque converter and is a function of slip speed between the engine and the turbine.

If only the engine dynamic system is considered, the engine resistance torque, or turbine torque, can be changed to control engine acceleration if the throttle opening is fixed. However, turbine torque, or engine resistance torque, that is required to control the engine acceleration into a desired acceleration is different from the fixed turbine torque when turbine acceleration is controlled into a desired value. The control may be overcompensated because the torque required to change the engine acceleration is much larger than the turbine torque received from the engine. Therefore, it is desirable to provide optimized control during a kickdown shift to further improve shift quality. A continuous variable and speed-based desired acceleration method to provide consistent and accurate transmission control based in part on accumulator pressure is proposed.

SUMMARY OF THE INVENTION

A vehicle transmission comprises a plurality of gears. A torque converter assembly transmits torque between an engine and the plurality of gears through a plurality of engagement elements. A plurality of solenoids are operable to actuate the plurality of engagement elements. An accumulator is indicative of a pressure of at least one of the engagement elements. A controller calculates a torque of the at least one engagement element based on a first relationship between a volume of the accumulator and the pressure, and controls the torque based on a second relationship between the torque and a duty cycle of at least one of the solenoids.

In another aspect of the invention, a transmission control method for kickdown shifts comprises releasing a release engagement element. The release engagement element is applied when a volume of the release engagement element reaches a threshold capacity of the release engagement element. The volume of the release engagement element is decreased, thereby increasing transmission turbine speed. A volume of an apply engagement element is increased when the transmission turbine speed reaches a first threshold. A target volume of the apply engagement element is determined. The volume of the apply engagement element is controlled according to the target volume.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE iPREFERRED EMBODIMENTS

The following description of the preferred embodiment(s) is merely exemplary in nature and is in no way intended to limit the invention, its application, or uses.

Figure 1:
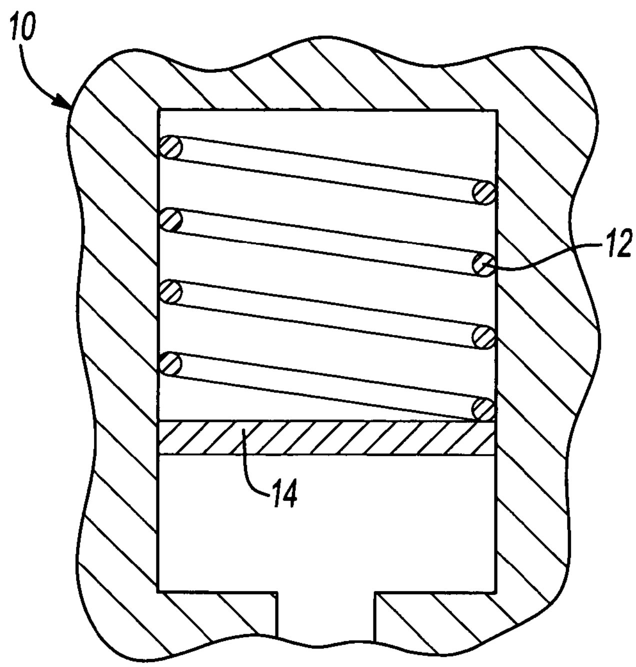
FIG. 1 illustrates an accumulator according to the prior art.
Figure 2:
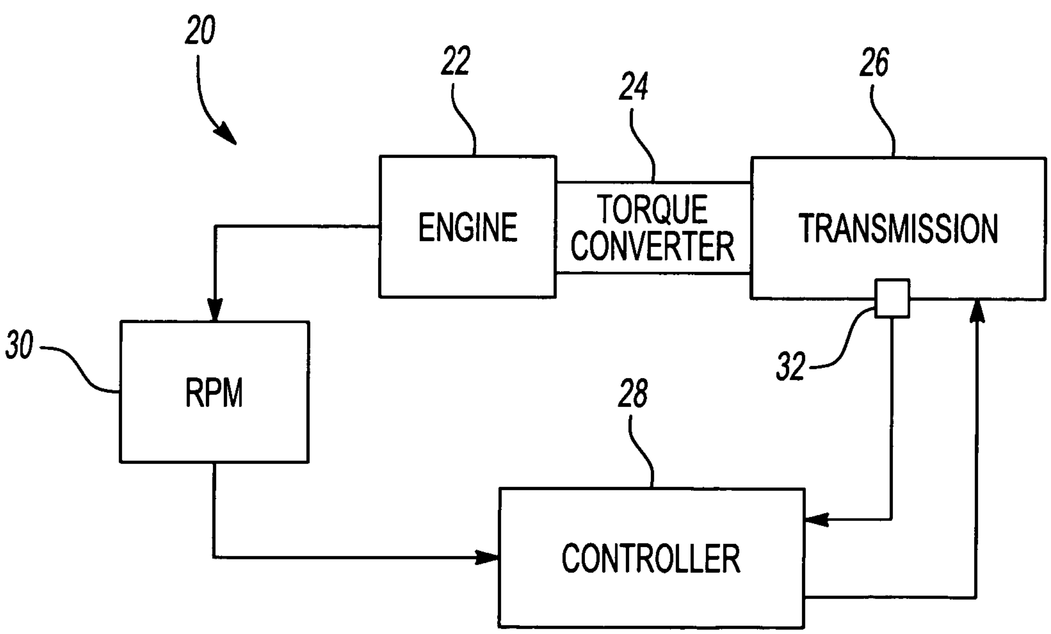
FIG. 2 is a functional block diagram of a transmission control system according to the present invention.

The present invention uses a model-based approach to identify speed and torque dynamics for each transmission element during transmission shift operations. Referring now to FIG. 2, a transmission control system 20 includes an engine 22, a torque converter 24, an automatic transmission 26, and a controller 28. The engine 22 drives the automatic transmission 26 through the torque converter 24. The transmission 26 drives a vehicle through a gear ratio. The controller 28 communicates with various sensors and controls transmission shifting. For example, an engine speed sensor 30 generates an engine speed signal. An accumulator 32 fills with oil, varying the volume of the accumulator 32, which changes clutch pressure. The controller 28 determines required torque of the transmission element clutches according to engine speed, volume of the accumulator 32, and additional factors of the torque converter 24 and the transmission 26, such as torque converter transferred torque, inertia for the engaged elements of the transmission 26, and desired turbine acceleration. The controller 28 further calculates a control duty cycle for the transmission 26 based on a relationship between each individual element clutch torque and pressure, and a relationship between accumulator pressure and accumulator volume change.

Figure 3:
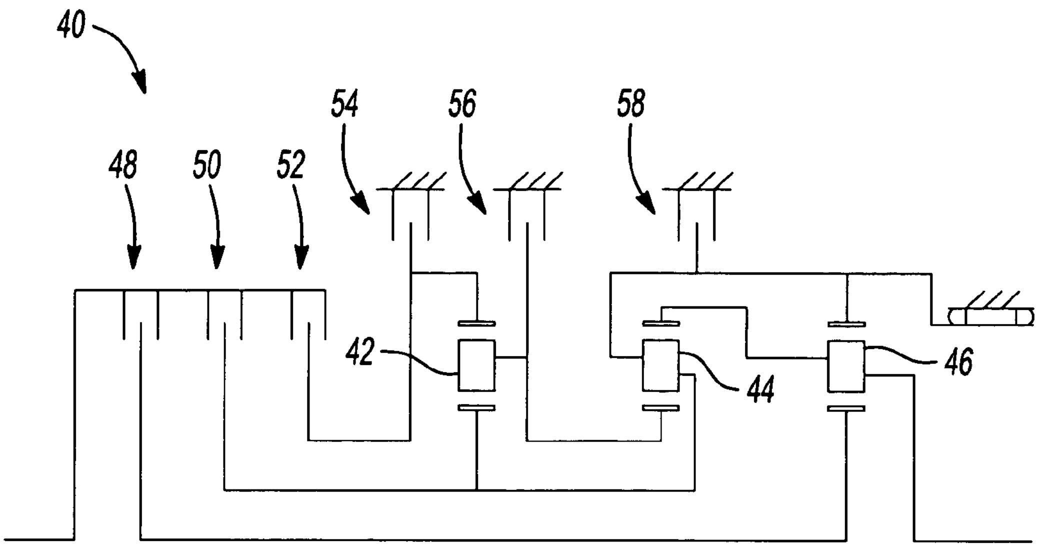
FIG. 3 illustrates a vehicle transmission according to the present invention.

Kickdown shifts are controlled based on target volume control and continuous variable, speed based desired acceleration. Referring now to FIG. 3, an exemplary automotive transmission 40 includes planetary gears 42, 44, 46 and element clutches 48, 50, 52, 54, 56, and 58. One or more of the clutches interact with one or more of the planetary gears in order to select a gear ratio of the transmission 40. For example, when clutch 54 is in contact with planetary gear 42, and clutch 56 is in contact with planetary gears 42 and 44, 4th gear is selected. However, in order to select 3rd gear, clutch 48 must be in contact with planetary gear 46 and clutch 56 must be in contact with planetary gears 42 and 44. Therefore, in order for the transmission 40 to downshift from 4th gear to 3rd gear, clutch 54 must release planetary gear 42 and clutch 48 must be applied to planetary gear 46. In any particular downshift, the element clutches that are releasing are referred to as "release element clutches." Conversely, element clutches that are applied during a downshift are referred to as "apply element clutches."

During the inertia phase of a kickdown shift, the torque required for releasing an element clutch is determined. Hereinafter, all references to the release clutch refer to clutch 54 with respect to a 4-3 kickdown shift wherein the clutch 54 is the release element clutch and clutch 48 is the apply element clutch. Although the following equations refer to a 4-3 kickdown shift, it should be understood that analogous calculations can be applied to other kickdown shifts. For a 4-3 kickdown shift (from 4th gear to 3rd gear), the torque for release element clutch 54 is:

$$T_{4c} = \frac{1}{4}[T_t - 3T_{ud} - (I_1 + 4I_2 + I_3 + 16I_4 + 9I_5)\alpha_t + (6I_2 + 12I_4 + 6I_5)\alpha_o]$$

where $T_t$ is turbine output torque, $T_{ucl}$ is torque at element clutch 48, $\alpha_t$ is turbine acceleration, $\alpha_0$ is output vehicle acceleration, and $I_1$ through $I_5$ are the inertia of each transmission element clutch as indicated in FIG. 3. The inertia of the release element clutch 54 is not considered. Because $\alpha_0$ is much smaller than turbine acceleration due to significant vehicle inertia, output inertia force $(6I_2+12I_4+6I_5)\alpha_0$ and the torque at element clutch 48 can be removed, resulting in:

$$T_{4c} = \frac{1}{4}[T_t - (I_1 + 4I_2 + I_3 + 16I_4 + 9I_5)\alpha_t] \quad \text{(Equation 1)}$$

In a pulse width modulated solenoid system, the indication of clutch torque is accumulator volume. According to the relationship between the accumulator volume and the clutch pressure, equation 1 becomes:

$T_{4c}=P_{4C}A_P\mu_f R_{eff} n_{4C}$, and subsequently, $$P_{4C} = \frac{1}{4\mu_f A_p R_{eff} n_{4C}}[T_t - (I_1 + 4I_2 + I_3 + 16I_4 + 9I_5)\alpha_t] \quad \text{(Equation 2)}$$

where $P_{4C}$ is the clutch pressure, $A_P$ is the friction material area, $\mu_f$ is the coefficient of friction, $R_{eff}$ is the effective radial, and $n_{4C}$ is the number of friction surfaces. The relationship between the accumulator volume and the clutch pressures is expressed as:

$$V_{4C} = \frac{A_A}{K_A}\left\{\frac{1}{4\mu_f}[T_t - (I_1 + 4I_2 + I_3 + 16I_4 + 9I_5)dt] - P_{pre}\right\} + V_{A\,min} \quad \text{(Equation 3)}$$

and $$V_A = \frac{A_A}{K_A}[P_A - P_{pre}] + V_{A\,min},$$

where $V_A$ is current accumulator volume, $A_A$ is accumulator piston area, $K_A$ is the accumulator spring coefficient, $P_A$ is accumulator pressure, $P_{pre}$ is pre-loaded accumulator pressure, and $V_{Amin}$ is the minimum accumulator volume.

Equation 1 is the required clutch torque during steady state conditions. Additionally, equation 1 is the theoretical initial value for feedback controls. In a transient case, the torque change required for acceleration can be estimated by taking the derivative of equation 1 as follows:

$$\frac{dT_{4c}}{dt} = \frac{1}{4}\left[\frac{dT_t}{dt} - (I_1 + 4I_2 + I_3 + 16I_4 + 9I_5)\frac{d\alpha_t}{dt}\right]. \quad \text{(Equation 4)}$$

This differential equation is discretized as:

$$\frac{T_{4C}^{des} - T_{4C}^{c}}{dt} = \frac{1}{4}\left\{\frac{T_t^i - T_t^{i-1}}{\Delta t} + (I_1 + 4I_2 + I_3 + 16I_4 + 9I_5)\frac{\alpha_t - \alpha_{dt}}{\Delta t}\right\}.$$

However, torque is not the actual control actuator in the preferred embodiment. Instead, the duty cycle of the solenoid is the control force used to change the torque in the element clutches. Therefore, the relationship between clutch torque and the duty cycle of the solenoid must be determined. The relationship between clutch torque and the duty cycle of the solenoid is based in part on a relationship between accumulator pressure and the flow rate:

$$Q_{DC}=\frac{dV_a}{dt}=\frac{A_a}{K_a}\frac{dP_{4C}}{dt},$$

where $Q_{DC}$ is the transmission oil flow rate, $V_a$ is accumulator volume, $A_a$ is accumulator area, $K_a$ is the accumulator spring coefficient, and $P_{4C}$ is the clutch pressure of clutch 54. Torque on the clutch 54 can be calculated based on accumulator pressure according to $T_{4C}=P_{4C}A_p\mu_f R_{eff}n_{4C}$, substituting the relationships between the clutch and the accumulator into the control equation, which is equation 1, results in a formulation of target volume control duty cycle flow rate as:

$$Q_{DC}=\frac{3A_a^2}{4\mu_f K_a R_{eff} N_{4c} A_p}\left\{\frac{T_t^i-T_t^{i-1}}{\Delta t}+(I_1+4I_2+I_3+16I_4+9I_5)\frac{\alpha_t-\alpha_{dt}}{\Delta t}\right\} \quad \text{(Equation 5)}$$

The first term in equation 5 is the torque required to overcome the torque input change from the torque converter. The second term is torque required to change the turbine and planetary gear inertias. Therefore, $$\frac{\delta V_t}{t_{tv}}=\frac{3A_a^2}{4\mu_f K_a R_{eff} N_{4c} A_p}(I_1+4I_2+I_3+16I_4+9I_5)\frac{\alpha_t-\alpha_{dt}}{\Delta t},$$

and $$\frac{\delta V_e}{t_{ev}}=\frac{3A_a^2}{4\mu_f K_a R_{eff} N_{4c} A_p}\frac{T_t^i-T_t^{i-1}}{\Delta t},$$

where $$\frac{\delta V_t}{t_{tv}}$$

is desired volume change due to turbine inertia force over time and $$\frac{\delta V_e}{t_{ev}}$$

is desired volume change due to engine inertia force over time.

Input torque is equal to engine flywheel torque when the converter clutch is in lock-up and/or partial lock positions. When the converter is in an unlock position, the input torque can be calculated by a torque converter slip regression model:

$T_t^i=\lfloor C_0 N_e^i+C_1(N_e^i-N_t^i)\rfloor N_e^i$ for $N_t<0.85N_e$, otherwise:

$$T_t^i=\left[\frac{C_0}{0.15}(N_e^i-N_t^i)+C_1(N_e^i-N_t^i)\right]N_e^i,$$

where $C_0$ and $C_1$ are constants, $N_e^i$ is engine speed, and $N_t^i$ is turbine speed.

Figure 4:
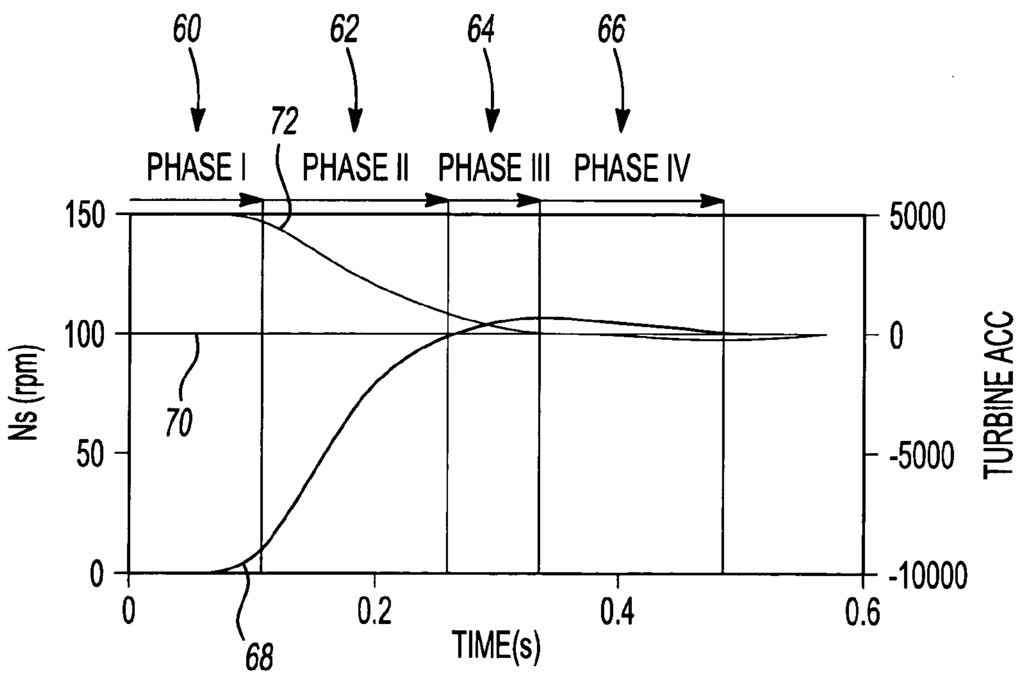
FIG. 4 illustrates a transmission kickdown control method according to the present invention.

Using the above models, the present invention determines transmission kickdown control according to a release phase 60, a target volume control phase 62, an apply element fill phase 64, and an apply element control phase 66 as shown in FIG. 4. The transmission control as described relates to $N_i$, or current turbine speed 68, $N_j$, or target turbine gear speed 70, and $N_t$, or turbine acceleration 72. In the release phase 60, $T_{4C}$ is calculated according to equation 1. When the capacity of clutch 54 (as shown in FIG. 3) is less than the required torque, turbine speed will increase from its original gear speed $N_j$. The acceleration of the turbine speed depends on the input torque and the control torque in clutch 54:

$$(I_1+4I_2+I_3+16I_4+9I_5)\alpha_t=T_t-3T_{UD}-4T_{4C}.$$

At the beginning of the kickdown shift, clutch 54 is released quickly. The clutch 54 is reapplied when the track volume $V_{4C}$ reaches the calculated volume from Equation 3. Then, $V_{4C}$ is slowly ramped down until the turbine speed reaches a desired acceleration. Thereafter, the character time of 96 is increased to satisfy the condition:

$$\alpha_d<-\frac{T_t-4(T_{4C})_{\min}}{I_1+4I_2+I_3+16I_4+9I_5}.$$

During the release phase 60, the turbine speed begins to increase from the turbine speed 68 toward the target gear speed 70 as the turbine acceleration 72 decreases.

In the target volume control phase 62, turbine speed approaches and/or reaches desired initial turbine acceleration $$\alpha_d=\frac{N_j-N_i}{\tau}.$$

Actual target volume control activates according to a target gear turbine speed and desired acceleration $$\alpha_d=-\frac{N_j-N_i+\Delta N}{\tau_2\left(1-e^{\frac{-\tau_1}{\tau_2}}\right)}e^{\frac{-t}{\tau_2}},$$

where $\tau_1$ is a desired time for the turbine to travel from the current gear speed to the desired gear speed and $\tau_2$ is the decal rate of the desired acceleration.

When $t>\tau_2-t_f$, where $t_f$ is the required apply element fast fill clutch volume time, the apply element clutch begins to fill. As shown in FIG. 4, the turbine acceleration 72 decreases as the turbine speed 68 increases toward the target gear speed 70.

In the apply element fill phase 64, $DC_t$ is applied to the apply element clutch after $N_t>N_j$. In other words, as the turbine speed 68 surpasses the target gear speed 70, torque is applied to the apply element clutch. In a 4-3 kickdown shift, the apply element clutch 48 pressure is:

$P_{UD}=T_t-4T_{4C}-(I_1-2I_2+I_3+4I_4+3I_5)\alpha_0+P_{rs}$, where $P_{UD}$ is the apply element clutch 48 pressure and $P_{rs}$ is pre-loaded accumulator spring pressure. The targeted volume to achieve this pressure is $$V_{UD} = \frac{A}{K_S}(PA - P),$$

where A is accumulator piston area and $K_S$ is spring stiffness.

In the apply element control phase 66, the turbine speed 68 begins to exhibit a negative slope. The release element is fast-vented in order to rapidly dump the pressure to the release element. Torque is managed to quickly ramp the apply element to full pressure. Therefore, the release element clutch is fully released based on the values of $N_t > N_j$ and $\alpha_t - \alpha_j$. In this manner, the release element is fully released and the apply element is fully applied, completing the gear change.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle transmission comprising:

a plurality of gears;

a torque converter assembly for transmitting torque between an engine and the plurality of gears through a plurality of engagement elements;

a plurality of solenoids that are operable to actuate the plurality of engagement elements;

an accumulator that is indicative of a pressure of at least one of the engagement elements;

a controller that calculates a torque of the at least one engagement element based on a first relationship between a volume of the accumulator and the pressure, and that controls the torque based on a second relationship between the torque and a duty cycle of at least one of the solenoids.

2. The vehicle transmission of claim 1 wherein the controller controls the torque by controlling the duty cycle.

3. The vehicle transmission of claim 1 wherein the first relationship is defined by $$V_A = \frac{A_A}{K_A}[P_A - P_{pre}] + V_{A\,min},$$

where $V_A$ is accumulator volume, $A_A$ is an accumulator piston area, $K_A$ is an accumulator spring coefficient, $P_A$ is accumulator pressure, $P_{pre}$ is pre-loaded accumulator pressure, and $V_{Amin}$ is the minimum accumulator volume.

4. The vehicle transmission of claim 1 wherein the first relationship is further defined according to inertias of the plurality of engagement elements.

5. The vehicle transmission of claim 1 wherein the second relationship is based in part on transmission oil flow rate.

6. A transmission control method for kickdown shifts comprising:

determining a pressure of an engagement element;

calculating a torque of the engagement element based on a first relationship between a volume of an accumulator and the pressure; and controlling the torque based on a second relationship between the torque and a duty cycle of a solenoid that actuates the engagement element.

7. The transmission control method of claim 6 wherein the step of controlling includes controlling the duty cycle.

8. A transmission control method for kickdown shifts comprising:

fast-venting a release element clutch at a first rate;

reducing the first rate when a volume of the release element clutch reaches a first threshold;

controlling turbine speed according to a desired acceleration model;

fast-filling an apply element clutch when the turbine speed reaches a second threshold;

increasing apply element clutch pressure according to a predicted apply element clutch capacity model;

fast-venting the release element clutch and fully-applying the apply element clutch when the turbine speed begins to decelerate.

9. The transmission control method of claim 8 wherein the step of fast-venting a release element clutch at a first rate occurs at the initiation of a kickdown shift.

10. The transmission control method of claim 8 wherein the desired acceleration model is based in part on a target gear speed.

11. The transmission control method of claim 8 wherein the second threshold is based on an estimated fill time of the apply element clutch.

* * * * *